Jan. 11, 1938.  H. W. HINDES  2,105,119
FERRULE FOR HANDLES AND METHOD OF ATTACHING SAME
Filed May 11, 1935

Inventor:
Howard W. Hindes
By Owen W. Kennedy
Attorney

Patented Jan. 11, 1938

2,105,119

UNITED STATES PATENT OFFICE 2,105,119

FERRULE FOR HANDLES AND METHOD OF ATTACHING SAME

Howard W. Hindes, Worcester, Mass., assignor to The Washburn Company, Worcester, Mass., a corporation of Massachusetts Application May 11, 1935, Serial No. 21,040

1 Claim. (Cl. 29—84)

The present invention relates to the handles of household utensils and tools, and has for its object to provide an improved construction and method of attaching the metallic ferrules that are customarily employed for the purpose of protecting the ends of handles against wear.

Heretofore difficulties have been encountered in holding metallic ferrules in position on handles so that they will not become loose, and when a ferrule is once loosened, the handle soon deteriorates due to the entrance of moisture into the exposed end of the handle. According to the present invention, there is provided an improved ferrule construction and method of attaching the same, whereby a ferrule is so mounted that it is practically impossible for it to become loose from the handle by reason of its firm attachment to the shank carrying the handle. The above and other advantageous features of the invention will hereinafter more fully appear from the following description taken in connection with the accompanying drawing, in which:—

Like reference characters refer to like parts in the different figures.

Figure 1:
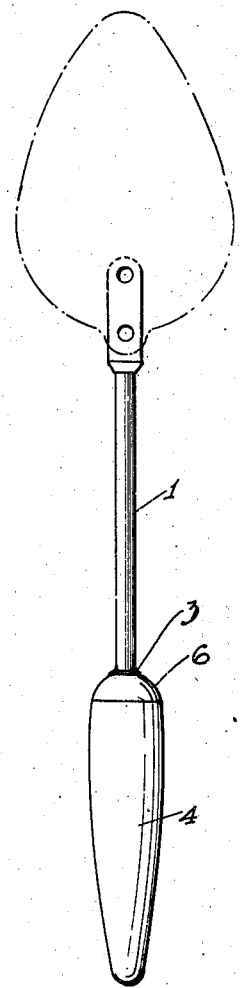
Fig. 1 is a plan view of a utensil handle provided with a ferrule mounted in accordance with the invention.

Referring to the drawing, a utensil or tool which may be of any desired form, as indicated in dotted lines in Fig. 1, provides a metallic shank 1 having a groove 2 formed therein near one end. Preferably the groove 2 is made by a rolling or squeezing operation, so that a rim 3 is formed on the surface of the shank 1 on the side of the groove away from the handle 4 that is to be attached to the shank. The end portion of the shank 1 beyond the groove 2 provides a series of corrugations 5 extending in the direction of the shank for a purpose which will hereinafter appear.

Figure 2:
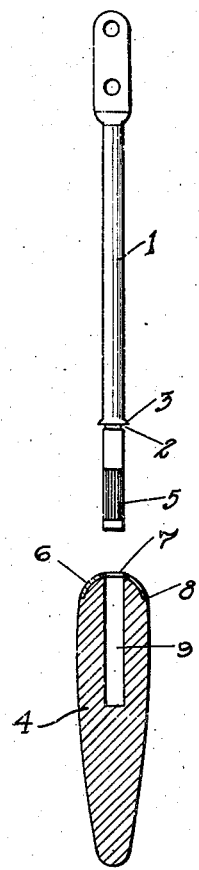
Fig. 2 illustrates the manner of preparing the shank of the utensil for the reception of the ferrule.

In Fig. 2 a metallic ferrule 6 of cup-shaped form provides a central opening 7 slightly smaller in diameter than the outside diameter of the shank 1. The ferrule 6 is positioned on a shoulder 8 at one end of the handle 4, the ferrule 6 closely fitting the shoulder so that the surface of the handle 4 beyond the shoulder 8 is substantially continuous with the outside surface of the ferrule. The handle 4 also provides a central opening 9 which is in alinement with the opening 7 in the ferrule when the latter is positioned on the shoulder 8, the handle opening also being slightly smaller in diameter than the shank 2.

Figures 3, 4:
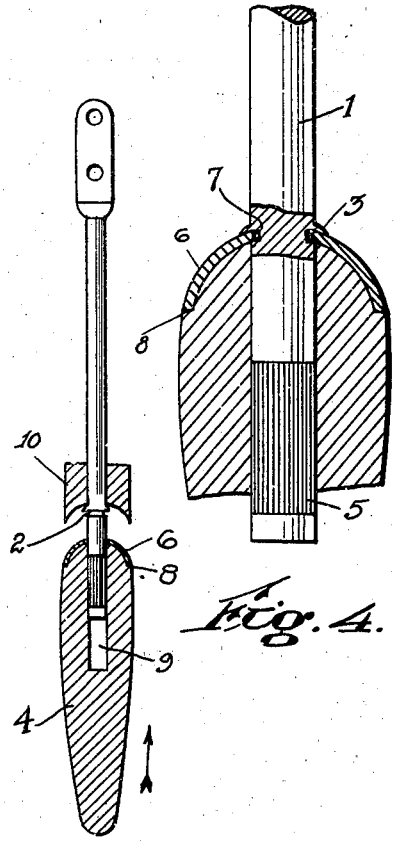
Fig. 3 shows the manner of applying the handle and ferrule to the utensil shank.
Fig. 4 is a fragmentary sectional view, on an enlarged scale, showing how the ferrule is held.

In Fig. 3 the handle 4 carrying the ferrule 6 is shown as having been forced part way on the shank 1 by pressure exerted in the direction of the arrow, with the shank 1 itself being held in the grip of a die 10 closely encircling the shank at the rim 3 of the groove 2. Movement of the ferrule 6 on the unreduced shank causes a certain amount of expansion around the periphery of the ferrule opening 7, while at the same time the corrugations 5 bite into the wall of the handle opening 9.

When the ferrule 6 reaches the groove 2 in its movement along the shank 1 by the pressure of the handle 4, the edges of the opening 7 actually snap into the groove 2, due to the release of the tension in the metal surrounding the opening 7. Almost simultaneously with this action, the end of the die engaging the rim 3 tends to force the rim 3 in close engagement with the ferrule 6 then positioned in the groove 2. The net result is that the ferrule 6 is clamped tightly between the forward end of the handle 4, then positioned on the shank 1, and the deformed rim 3 which, in effect, is peened over into contact with the ferrule. The above described results are shown on a somewhat exaggerated scale in Fig. 4, from which it is evident that the ferrule 6 is held very tightly in position, so that it cannot move on the shank 1 away from the handle 4 when once the latter has been forced on the shank 1, with the corrugations 5 firmly holding the handle itself in position. The completed utensil then appears as shown in Fig. 1, from which it is evident that the ferrule 6 appears as an integral part of the handle 4.

From the foregoing, it is apparent that by the present invention there is provided an improved ferrule construction and method of attaching the same whereby the ferrule is firmly held in position by reason of the fact that it is tightly clamped between the end of the handle and the slightly deformed rim surrounding the groove in the shank.

I claim:

The method of attaching a ferrule in a handle construction which consists in providing a metallic shank with a groove having a rim at one side thereof and forcing a metallic ferrule, having an opening initially smaller than the shank adjacent to the groove, on said shank by the pressure of a handle carrying the ferrule until said ferrule is seated in said groove, accompanied by deformation of the rim of said groove to clamp the ferrule between said rim and the end of said handle.

HOWARD W. HINDES.